United States Patent [19]

Boros et al.

[11] 4,226,838

[45] Oct. 7, 1980

[54] PROCESS FOR ACCELERATING THE DIGESTION AND SEDIMENTATION STEPS ON THE BAYER ALUMINA PROCESS

[75] Inventors: József Boros, Ajka; Zsolt Csillag, Budapest; Tibor Ferenczi, Tatabánya; Tibor Kálmán, Budapest; László Lengyel; József Mátyási, both of Almásfüzito; Ferenc Orbán; Károly Solymár, both of Budapest; Béla Tóth, Ajka; Lajos Tóth; István Vörös, both of Budapest; Kálmán Wentzely, Almásfüzito; János Zámbó, Budapest; József Zöldi, Tatabanya, all of Hungary

[73] Assignee: Almasfüzitoi Timföldgyár, Almásfüzitö, Hungary

[21] Appl. No.: 5,996

[22] Filed: Jan. 24, 1979

Related U.S. Application Data

[63] Continuation-in-part of Ser. No. 834,273, Sep. 19, 1977, abandoned.

[30] Foreign Application Priority Data

Dec. 7, 1976 [HU] Hungary ............................. AU 368

[51] Int. Cl.² ................................................. C01F 7/06
[52] U.S. Cl. ..................................... 423/121; 423/131
[58] Field of Search ............... 423/119, 121, 111, 122, 423/131

[56] References Cited

U.S. PATENT DOCUMENTS

| | | | |
|---|---|---|---|
| 3,737,514 | 6/1973 | King ..................................... | 423/121 |
| 3,944,648 | 3/1976 | Solymar et al. ...................... | 423/121 |
| 4,026,989 | 5/1977 | Orban et al. ......................... | 423/121 |
| 4,091,071 | 5/1978 | Boros et al. ......................... | 423/121 |

FOREIGN PATENT DOCUMENTS 2558411  7/1976  Fed. Rep. of Germany ........... 423/121

*Primary Examiner*—Herbert T. Carter

[57] ABSTRACT

An improved process for accelerating the digestion process in the Bayer alumina process is provided which promotes both the goethite-hematite conversion and a more perfect and quick dissolution of the diaspore. The above is achieved by carrying out the digestion in the process of 5–20% by weight calculated on the dry weight of the bauxite of a novel hydrogarnet catalyst.

7 Claims, 4 Drawing Figures

PROCESS FOR ACCELERATING THE DIGESTION AND SEDIMENTATION STEPS ON THE BAYER ALUMINA PROCESS

CROSS-REFERENCE TO RELATED APPLICATION

This application is a continuation-in-part of Ser. No. 834,273 filed Sept. 19, 1977 and now abandoned.

The rentability of the Bayer process is influenced primarily by the quantity of alumina extracted from bauxite ($Al_2O_3$ yield) and by the separability of the formed red mud. On processing diasporic type bauxite it is difficult to dissolve completely the $Al_2O_3$ content bound to the diasporic mineral in the sodium aluminate liquor used for digestion. The dissolution can be accomplished only at a higher digestion temperature, generally at 240°–260° C. with the addition of calcinated lime and in a solution having higher caustic molar ratio than the solution required for the digestion of boehmite type bauxites. The caustic molar ratio is a quotient of caustic sodium oxide moles in solution and of $Al_2O_3$ mole numbers, whereas the caustic sodium oxide content represents a bond alkali content in form of sodium hydroxide and $NaAlO_2$ expressed in sodium oxide.

On processing goethite type bauxites it is a disadvantage that the Al content incorporated in the goethite crystal lattice by isomorphic substitution cannot be recovered and further that the red mud obtained from goethite containing bauxites can be separated only in a difficult way. Similar separation problems are encountered on processing bauxites containing finely dispersed hematite. These difficulties can be eliminated by transforming goethite into hematite or by recrystallizing the finely dispersed hematite respectively.

A known method widely used on processing of diasporic type bauxite is the addition of lime in order to promote the dissolution of diasporic minerals. The calcinated lime is added in general in a solid form into the mill in combination with the bauxite slurry. An up to date variation of this method is disclosed in the French patent specification No. 1,280,009 in which 2.5–6.0 weight % of CaO calculated on the amount of dried bauxite is used which has a granular size in total below 0.04 mm, 40% thereof having, however, a granular size below 0.01 mm. The effect of CaO or $Ca(OH)_2$ suspension respectively is thereby enhanced.

In the last years several methods have been elaborated for the processing of goethite type bauxite and for transforming goethite into hematite. According to U.S. Pat. No. 3,737,514 the conversion of goethite into hematite in the presence of a calcium compound is accomplished in a way that the titanium compounds of the bauxite are converted into calcium titanate. According to this method a two-step digestion is used: the first step is carried out at 280°–350° C. and the second one at 200°–350°. A considerable technical progress has been achieved further by technologies elaborated in Hungary according to which digestion is realized in one step at a substantially lower temperature range as suggested in the technologies referred to, preferably at 230°–250° C. Such a temperature decrease is possible only by using catalysts for the goethite-hematite conversion.

According to a process disclosed in Hungarian Pat. No. 164,863 (corresponding to British Pat. No. 1,382,960) sodium chloride is used in addition to CaO as catalyst. In the process disclosed in Hungarian Pat. No. 166,061, which corresponds to U.S. Pat. No. 3,944,648, sulfate ion catalyst is suggested. In a recently developed process disclosed in U.S. Pat. No. 4,091,071, magnesium and/or manganese and/or divalent iron ions as catalyst are proposed. The enumerated additives combined with calcinated lime are decreasing substantially the digestion temperature and time period respectively which is required for the goethite-hematite conversion.

The process of this invention represents a considerable technical advance over the above processes since it provides simply with the aid of calcinated lime in the frame work of given technology a novel hydrogarnet type catalyst which promotes both the goethite-hematite conversion and a more perfect and quick dissolution of the diaspore. The effect of this novel catalyst equals or sometimes surpasses the effect of the most advantageous catalyst hitherto known. At the same time the technology proposed in this invention can be carried out with respect to the processes referred to in the practice in a more simple and economic manner. The provision, transport, addition and costs of the other catalyst can be eliminated. The preparation of the hydrogarnet type catalyst can be accomplished in the lime hydration step which is necessary to form the proper reactivity of the calcinated lime; in other words, the catalyst proposed can be prepared without inserting a separate step into the technology process.

The term "hydrogarnets" is applied to determine crystalline phrases of garnet structure in the crystal lattice of which hydroxyl groups occur, substituting isomorphously part or all $[SiO4]^{4-}$ tetrahedra in the form of $[(OH)_4]^{4-}$ groupings. Owing to this particular kind of isomorphous substitution hydrogarnets include both silicates and structurally similar nonsilic compounds.

The invention is based on the recognition that the goethite-hematite convertion and the solution of diaspore takes place according to substantially the same reaction mechanism through the formation of an intermediary compound of hydrogarnet type, which can be characterized by the following formula

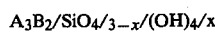

$$A_3B_2/SiO_4/_{3-x}/(OH)_4/x$$

where A represents $Ca^{2+}$, $Mg^{2+}$, $Mn^{2+}$ or $Fe^{2+}$, B represents $Al^{3+}$, $Fe^{3+}$, $Cr^{3+}$ or $Al^{3+}.yFe^{3+}$ wherein y is 0.05 to 0.5, and x may vary from 0 to 3.

In the case when this intermediary compound is prepared beforehand and is incorporated as such into the reaction system, this compound exerts a catalytic effect in the course of the digestion. The formation of a compound of the hydrogarnet type takes place in the reaction system otherwise under less advantageous circumstances. The formation thereof is however hindered but as an intermediary phase it is present in the known processes referred to as well. The formation of hydrogarnet type catalyst having an advantageous composition is hindered in the customary Bayer process below a temperature of 100° C. by the high $Al_2O_3$ and by the low silica content of the digesting liquor. At a temperature higher than 100° C. even at the digestion temperature the formation of hydrogarnet is hindered by the formation of different calcium containing compounds (3 $CaO.Al_2O_3.6H_2O$, $CaTIO_3$, $Ca_3/PO_4/_2$, etc.) which decrease the quantity of the hydrogarnet intermediary phase required for the convertion of goethite further for the dissolution of the diaspore. In such cases the formation of hydrogarnet in a sufficient quantity is possible only if a higher lime surplus, a higher temperature or a longer digestion period is applied.

The role of the intermediary phase in the process resides in the fact that it interacts with the goethite and diaspore as well and it enables the decomposition of these minerals, thereafter owing to its mobile structure it promotes the dissolution of the aluminium or iron content transiently incorporated into the hydrogarnet structure in form of trivalent ions. The dissolved $Fe^{3+}$ ions are crystallized in form of hematite whereas $Al^{3+}$ remains in dissolved state. The properties of the hydrogarnet can be influenced by the deliberate variation of the composition and morphology thereof.

On the above basis the invention relates to an improved process for accelerating the digestion procedure of bauxite containing diaspore or goethite processed according to the Bayer technology at a temperature of from 180°–300° C. with the aid of an aluminate digestion liquor having a sodium oxide concentration of 80–300 g/liter for increasing the alumina yield, for converting goethite into hematite and for recrystallizing the resulting finely dispersed hematite wherein the improvement comprises carrying out the digestion with the addition of a hydrogarnet catalyst having a composition of $A_3B_2/SiO_4/_{3-x}/(OH)_{4/x}$ as defined above in an amount corresponding to 5–20% by weight calculated on the dry weight of the bauxite. The hydrogarnet can be prepared separately or during the procedure under a temperature of about 100° C. The addition of the hydrogarnet compound is harmonized with the composition of the bauxite to be processed and it corresponds to the bonding strength of goethite or finely dispersed hematite which is present in the bauxite.

On carrying out the process of invention on a commercial scale the catalyst of hydrogarnet type is added per se. The additive containing hydrogarnet, however, exerts also its catalysing effect even in the presence of CaO containing compounds. The hydrogarnet catalyst is prepared according to one embodiment of the invention with the aid of 3–4 mole of CaO/mole silica which CaO is added in form of calcinated lime and with the aid of red mud which is obtained in the given alumina plant. The addition of a substance obtained by treatment of red mud into the digestion step is a surprising measure since a recirculation of a hydrogarnet containing red mud can be considered a suitable measure only if such a material has a catalysing effect in the digestion. It is known namely that the red mud in itself is a ballast material in the digestion step.

Another preferred embodiment of the present invention is when the iron-hydrogarnet catalyst is prepared at the calcinated lime. According to this procedure the hydration of the calcinated lime is carried out in the aluminate liquor (e.g. digestion liquor) in such manner that simultaneously with the hydration of lime red mud is added as well in a quantity corresponding to 20–100 percent of the calcinated lime. In the latter case owing to the higher molar concentration of the given solution an iron containing hydrogarnet is formed which has a specifically advantageous catalysing effect. In the formula of the hydrogarnet which is $$A_3B_2/SiO_4/_{3-x}/(OH)_{4/x}$$

the component A represents $Ca^{2+}$ and component B represents $Al^{3+}-yFe^{3+}$ wherein Y is 0.05 to 0.5. The partial replacement of $Al^{3+}$ by $Fe^{3+}$ ions can be secured in case the ratio of calcinated lime to red mud (or bauxite respectively) corresponds to 1:1 to 5:1. The properties of such a $Fe^{3+}$ containing hydrogarnet are especially favourable in respect to the catalysing of the procedure. The $Fe^{3+}$ ions replace in such cases 10–50% of the $Al^{3+}$ ions. The catalyst obtained through this process is preferably added to the bauxite slurry to be milled.

The most preferred composition for the claimed catalyst is a hydrogarnet containing calcium, iron, aluminum and hydroxyl wherein the presence of silicate is necessary and is of the formula

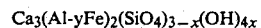

wherein x is 1 to 2.95 and y is 0.05 to 0.5

According to another embodiment of this invention the hydrogarnet catalyst is prepared during the removal of silica. In order to dissolve kaolinite and to precipitate the sodium-alumo-hydrosilica, the bauxite slurry with a temperature of about 100° C. is treated with lime. The lime is prepared beforehand by dissolving CaO in alkaline liquor. The treatment is carried out at such a moment when the silica content of the solution is the highest. In such a way ironhydrogarnet catalyst can be prepared in the alumina manufacturing system with a good efficacy. On carrying out the process on a commercial scale it is advantageous when in contrast to the processes mentioned in the patent specifications referred to the calcinated lime for the preparation of the hydrogarnet is used in a solid phase but hydrated in an alkali liquor prior to addition and in given case the hydrated lime is activated also in a mechanical manner.

As another possibility the hydrogarnet catalyst can be prepared in the following manner: on hydrating the calcinated lime in the digesting liquor 20–200 percent bauxite is added calculated on the amount of the calcinated lime which bauxite is derived either from the ore to be processed which is milled or a bauxite containing slurry in a proper amount is introduced into the hydration of lime and the bauxite slurry is taken from the removal of silica. In this case the kaolinite content of the bauxite goes into solution at a temperature of about 90°–100° C. and a hydrogarnet having a very advantageous catalysing property is obtained.

In order that the process of this invention may be more fully understood reference is made to the following detailed Examples:

EXAMPLE 1

A bauxite of Hungarian origin (Halimba, Hungary) corresponding to the composition disclosed in Table I, is digested at 240° C. for an hour. The digesting liquor contained 225 g/liter of $Na_2O$ caustic and has a molar ratio of 3.4. Having finished the digestion the molar ratio of the digesting liquor decreased to 1.32.

Figure 1:
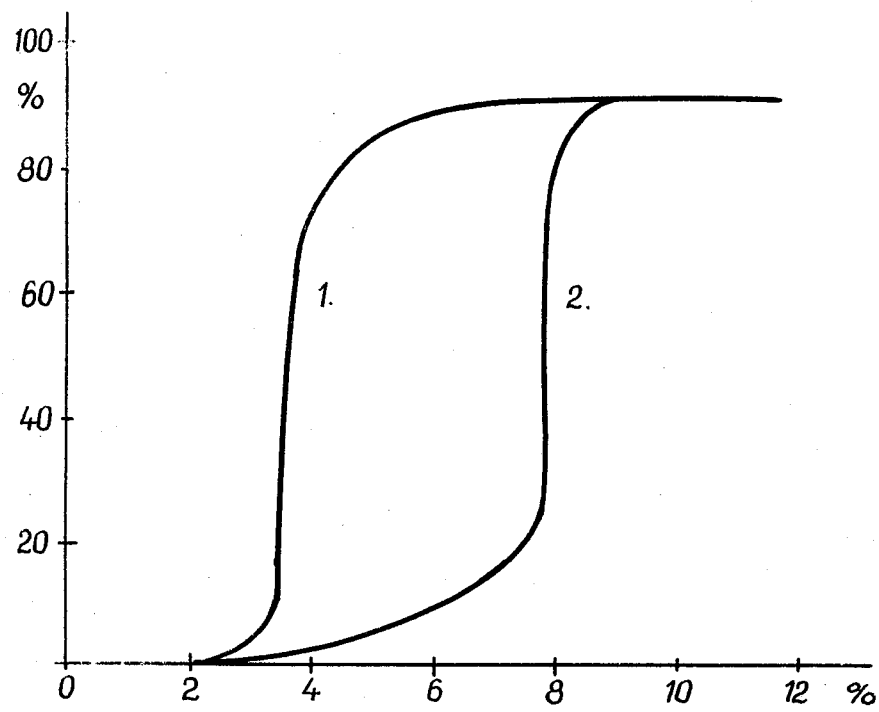
FIGS. 1, 2, 3 and 4 graphically show the results of Examples 1, 2, 3 and 5, respectively.

The results of this experiment are shown in FIG. 1, where on the ordinate the efficacy of the goethite conversion is plotted against the CaO content of the formed red mud. On Curve 1 a digestion is shown where the hydrogenated catalyst has been prepared prior to digestion out of red mud. In Curve 2 for comparison purposes result of a digestion is shown carried out in the presence of CaO + 5 g/liter of $Na_2SO_4$. The composition of red mud containing hydrogarnet as catalyst was the following:

| Fe$_2$O$_3$ % | Al$_2$O$_3$ % | SiO$_2$ % | TiO$_2$ % | Ignition losses % | CaO % | Na$_2$O % |
|---|---|---|---|---|---|---|
| 28,8 | 15,7 | 10,6 | 4,0 | 15,7 | 22,1 | 2,9 |

Comparing the results of the two experiments, it can be clearly seen that employing a hydrogarnet catalyst 50–60 percent of the active substance expressed in CaO suffices to attain the same result. (4–5 percent instead of 8–9 percent).

EXAMPLE 2

As raw material the same bauxite as in Example 1 is employed. The digestion is however carried out at 235° C. whilst adding constantly CaO and hydrogarnet respectively. The efficacy of the goethite-hematite conversion was investigated as a function of the digesting time period. The hydrogarnet catalyst was prepared at the hydration of calcinated lime using a weight ratio in respect to calcinated lime and dry weight bauxite corresponding to 1:1. The chemical composition of the obtained catalyst was the following:

| Fe$_2$O$_3$ % | Al$_2$O$_3$ % | SiO$_2$ % | TiO$_2$ % | CaO % | Na$_2$O % | Ignition losses % |
|---|---|---|---|---|---|---|
| 12,6 | 18,2 | 4,3 | 1,8 | 35,6 | 2,1 | 22,5 |

Figure 2:
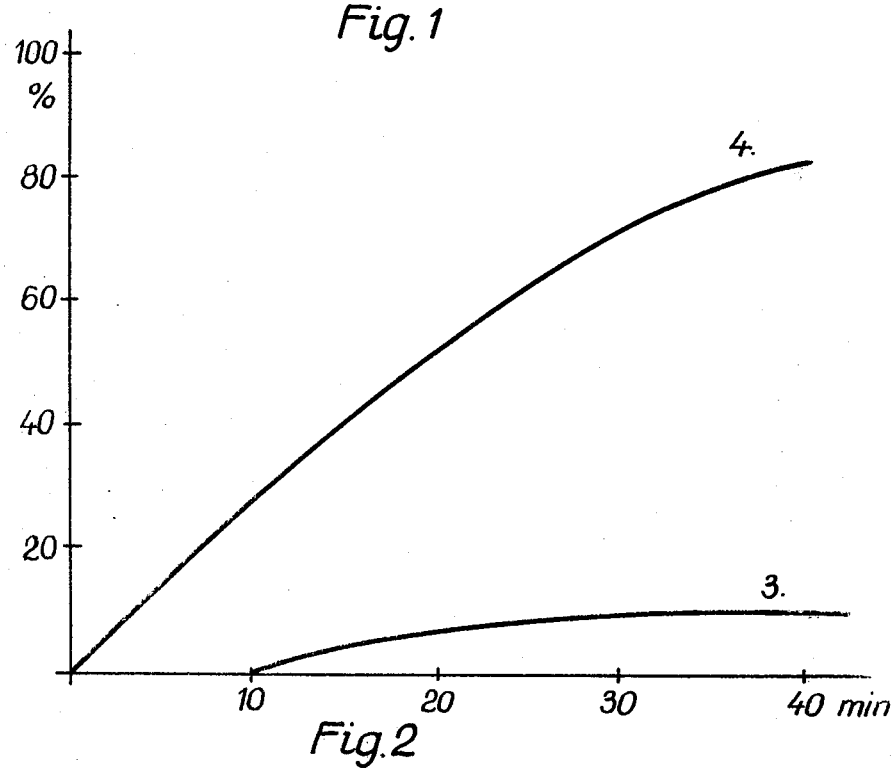

The experimental results are shown in FIG. 2 where curve 3 exhibits the control test that is a result of a digestion carried out in the presence of CaO+5 g/liter Na$_2$SO$_4$(the CaO content of the formed red mud was 6.3%) whereas curve 4 shows the effect of the hydrogarnet catalyst. Although the CaO content of the formed red mud amounted only to 5.2% the goethite-hematite conversion took place within a time period of about 40 minutes with an advantageous efficacy, whereas the conversion of the control test in respect to the goethite-hematite conversion was negligible. The yield of the digestion increased with 1.2%, owing to the conversion effected the sedimentability of the red mud improved with 28%, that is the capacity of the sedimentation tank could be increased accordingly. This considerable improvement of the sedimentation can be achieved only in a way that according to the process of invention not only the goethite-hematite convertion but the recrystallizing of the hematite content of the bauxite as well took place. The chemical composition of the red muds obtained in the two experiments which are characterizing the digestion process are disclosed in Table 1.

EXAMPLE 3

A bauxite having a higher goethite content of Hungarian origin (Iszkasz entgyorgy) and of a composition corresponding to Table 2 was digested at 235° C. A hydrogarnet prepared during the hydration of the calcinated lime was used as catalyst. On preparing the catalyst 1:1 mixture of CaO and of red mud was used which was treated with a caustic liquor containing 140 g/liter Na$_2$O caustic and having a molar ratio of 3.5. The composition of the catalyst thus prepared was the following:

| Fe$_2$O$_3$ % | Al$_2$O$_3$ % | SiO$_2$ % | TiO$_2$ % | CaO % | Na$_2$O % | Ignition losses % |
|---|---|---|---|---|---|---|
| 12,6 | 18,2 | 4,3 | 1,8 | 35,0 | 2,1 | 22,1 |

10% of the Fe$^{3+}$ ions was replaced in the hydrogarnet by Al$^{3+}$ ions. Such a catalyst was added to the bauxite to be processed in such a quantity which resulted a CaO content amounting to 8% in the obtained red mud after digestion. The control test was carried out with a digesting liquor containing and identical amount of CaO and 5 g/liter of Na$_2$SO$_4$ as well. The composition of the digesting liquor was identical in both Examples that is in Examples 1 and 2.

Figure 3:
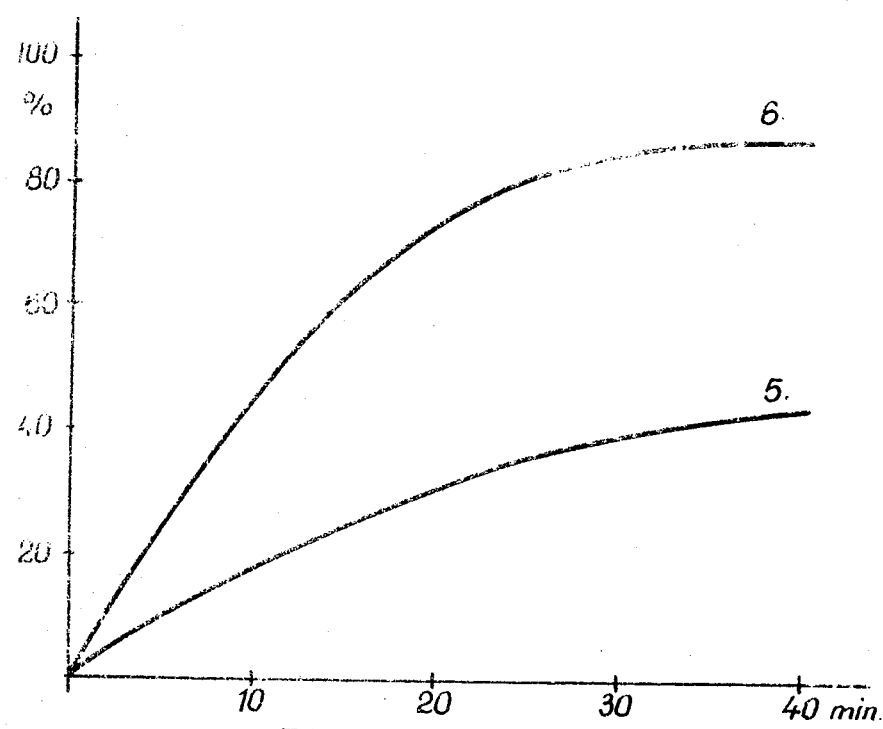

The results are shown in FIG. 3 where the efficacy of the goethite-hematite conversion is plotted against the digesting time period. Accordingly, with the aid of the hydrogarnet catalyst (Curve 6) a conversion near to 90% was obtained within 30 minutes whereas the control test (Curve 5) resulted only 40% efficacy within the same digesting time. The composition of the red mud obtained in the two experiments is disclosed in Table 2. From these experiments it can be seen that owing to the effect of the hydrogarnet catalyst the alumina yield increased with 2.5%. The loss in sodium caustic liquor decreased with 12% in both cases compared to a digestion carried out without an additive and simultaneously the sedimentability of the red mud increased with 35% due to the goethite-hematite conversion and the increase of the crystal size of hematite. These consequences can be seen on basis of the specific surface values of the investigated red mud sample which are 18.1 m$^2$/g and 8.6 m$^2$/g respectively.

EXAMPLE 4

A bauxite of Jamaican origin having a composition corresponding to Table 3 was processed. This bauxite contained in addition to goethite finely dispersed hematite as well. Calculating on basis of X-ray diffractogram half value width the average grain size of the goethite and hematite was 140–150 Å. The bauxite was digested at 240° C. for 30 minutes. The goethite-hematite conversion and the recrystallization of hematite was promoted by a hydrogarnet catalyst prepared during the silica removal process prior to digestion. On preparing the hydrogarnet catalyst the calcinated lime was hydrated with a caustic liquor obtained on washing the alumina and having a 40 g/liter Na$_2$O caustic content. The hydrated lime was thereafter activated in a mechanical way (by shearing under centrifugal forces) and after mechanical activation was added to the slurry of bauxite and digestion liquor which was held 3 hours at 100° C. By this time the dissolved silica content of the solution attains the highest value amounting to 3–4 g/liter during the silica removal operation requiring altogether 8 hours. On adding the hydrated lime under quick agitation and in a good efficacy hydrogarnet can be formed. After finishing the silica removal operation the slurry was heated to 240° C. for digestion.

In the control test the calcinated lime the amount thereof being in both cases 2% calculated on the weight of the dried bauxite was added in a usual way according to French Pat. No. 1,280,003 in a finely ground state to the bauxite to be processed. The results of the digestion carried out according to the methods disclosed in this Example is illustrated in Table 3 by the composition of the red mud obtained in both cases. Although the goethite-hematite conversion took place in the control test as well in a rate near to 80% the granular size of the remained goethite and hematite hardly increased in the red mud, the size thereof was about 150–160 Å. The specific surface value of the red mud remained very high above 30 m$^2$/g and the sedimentability of the red mud was much less advantageous than that of the red mud obtained on processing Hungarian and Yugoslavian bauxites having a high goethite content. With the aid of the hydrogarnet catalyst not only the goethite-hematite convertion occurred nearly completely (95%) but simultaneously the recrystallization of the finely dispersed hematite took place with a good efficacy. The average granular size of hematite increased to about 200 Å, the specific surface value of red mud decreased to a value of 12.2 m²/g and the improvement of the sedimentability was 85% compared with the red mud used as a control.

EXAMPLE 5

Figure 4:
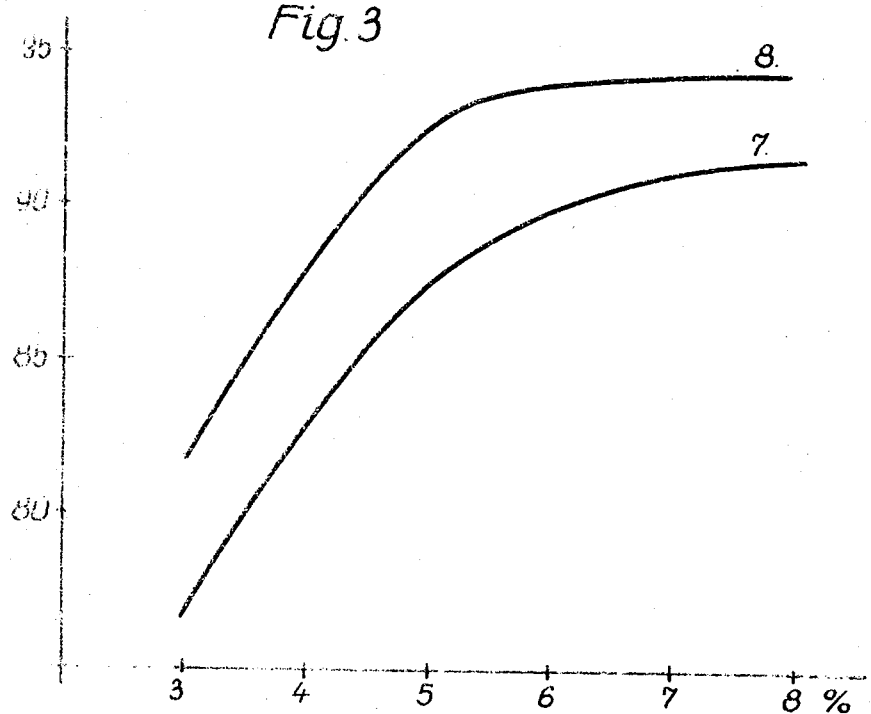

A bauxite of diasporic type having a composition corresponding to Table 4 was digested at 250° C. for an hour. The digestion was carried out to promote the dissolution of the diaspore in the presence of a hydrogarnet catalyst prepared according to Example 3. In the control test the method of digestion referred to in French Pat. No. 1,280,009 was used. 3–6% of CaO was added calculated on the weight of the dried bauxite. The experimental data was illustrated on FIG. 4. where the alumina yield is plotted against the added CaO content incorporated into the system in the form of calcinated lime or in form of CaO containing hydrogarnet respectively. Curve 7 shows the result of the addition of calcinated lime whereas curve 8 that of the hydrogarnet addition. On basis of FIG. 4 it can be seen that using the process of invention by employing a hydrogarnet catalyst in respect to a given bauxite type the alumina yield is with 5% higher keeping other circumstances constant. The compositions of the obtained red muds digested with 5% CaO in form of calcinated lime or in the presence of hydrogarnet are shown in Table 4.

A further advantage of this invention lies therein that the molar ratio after digestion may be reduced with 0.1 comparing this to other technologies carried out with calcinated lime. The decrease of the molar ratio is in the instant case 1.65–1.53. The reduction of the molar ratio has in turn the consequence that the quantity of bauxite to be digested can be increased calculating or a unitary volume and the costs of digestion can be reduced accordingly.

EXAMPLE 6

The process of Example 3 was repeated, with the difference that the hydrogarnet catalyst was prepared in such a way that calculating on the amount of CaO about 20% of divalent manganese containing ore was added as well.

EXAMPLE 7

The process of Example 3 was repeated with the difference that on preparing the hydrogarnet catalyst calculated on the amount of CaO 25% of divalent iron containing ore was added as well.

EXAMPLE 8

A bauxite of Hungarian origin (Iszakaszentgyorgy) with a high goethite content having a composition corresponding to Table 2 was digested at 235° C. Otherwise the same conditions were kept as in Example 3. The hydrogarnet catalyst was prepared from an 1:1 mixture of CaO and the bauxite to be processed, which mixture was treated with a digestion liquor having 200 g/liter $Na_2O$ caustic concentration and of a molar ratio of 3.5. The chemical composition of the additive containing hydrogarnet was as follows:

| CaO % | $SiO_2$ % | $Fe_2O_3$ % | $Al_2O_3$ % | $TiO_2$ % | $Na_2O$ % | Ignition losses % |
|---|---|---|---|---|---|---|
| 37,4 | 3,3 | 6,9 | 27,9 | 0,9 | 0,5 | 22,2 |

Within a digestion time amounting to 40 minutes about 90% of the goethite content of the bauxite was converted into hematite and simultaneously the sedimentation rate and the digestion yield was improved to similar extent as in the experiment carried out according to Example 3.

TABLES

The composition of the used bauxites and red muds prepared therefrom and the obtained alumina yields

1. Hungarian bauxite /of Halimba/

| Chemical composition: | | | Mineralogical composition | | | |
|---|---|---|---|---|---|---|
| $Fe_2O_3$ | % | 22,7 | $Al_2O_3$ | % | in bohmite | 34.5 |
| $Al_2O_3$ | % | 51,3 | | | in gibbsite | 11,2 |
| $SiO_2$ | % | 5,7 | | | in diaspore | traces |
| $TiO_2$ | % | 2,9 | | | in kaolinite | 4,8 |
| CaO | % | 0,6 | | | in goethite | 0,4 |
| MgO | % | 0,3 | | | in hematite | 0,3 |
| Ignition losses | % | 16,2 | $SiO_2$ | % | in kaolinite | 5,6 |
| | | | | | in quartz | 0,1 |
| | | | $Fe_2O_3$ | % | in hematite | 18,6 |
| | | | | | in goethite | 4,1 |
| | | | $TiO_2$ | % | in rutile | 0,9 |
| | | | | | in anatase | 3,0 |

Composition and yield of red muds

| Additive | $Fe_2O_3$ % | $Al_2O_3$ % | $SiO_2$ % | $TiO_2$ % | CaO % | $Na_2O$ % | Ignition losses % | $Al_2O_3$ yield % |
|---|---|---|---|---|---|---|---|---|
| Example 1 | | | | | | | | |
| Hydrogarent | 47,2 | 13,2 | 12,0 | 5,7 | 4,7 | 7,9 | 5,2 | 87,6 |
| CaO + $Na_2SO_4$ | 47,3 | 14,6 | 11,9 | 5,6 | 5,1 | 7,6 | 7,4 | 86,4 |
| EXAMPLE 2 | | | | | | | | |
| Hydrogarent | 44,1 | 13,7 | 12,1 | 5,3 | 5,2 | 7,4 | 5,9 | 86,3 |
| CaO + $Na_2SO_4$ | 43,4 | 14,6 | 11,8 | 5,4 | 6,4 | 7,5 | 8,0 | 85,1 |

TABLES-continued

2. Hungarian bauxite /of Iszkaszentgyorgy/

| Chemical composition: | | | Mineralogical composition: | | | |
|---|---|---|---|---|---|---|
| $Fe_2O_3$ | % | 18,8 | $Al_2O_3$ | % | in gibbsite | 12,8 |
| $Al_2O_3$ | % | 49,6 | | | in bohmite | 26,1 |
| $SiO_2$ | % | 8,2 | | | in diaspore | 0,4 |
| $TiO_2$ | % | 2,4 | | | in goethite | 0,8 |
| CaO | % | 1,7 | | | in hematite | 0,6 |
| MgO | % | 0,9 | | | in kaolinite | 8,9 |
| | | | $Fe_2O_3$ | % | in hematite | 12,8 |
| | | | | | in goethite | 6,0 |
| | | | $TiO_2$ | % | in anatase | 1,8 |
| | | | | | in rutile | 0,6 |
| | | | CaO | % | in calcite | 0,4 |
| | | | | | in dolomite | 1,3 |

Composition and yield of red mud:

| Additive | $Fe_2O_3$ % | $Al_2O_3$ % | $SiO_2$ % | $TiO_2$ % | CaO % | Ignition losses % | $Al_2O_3$ yield % |
|---|---|---|---|---|---|---|---|
| Hydrogarnet | 36,0 | 16,5 | 16,1 | 4,6 | 7,8 | 7,2 | 82,7 |
| CaO + $Na_2SO_4$ | 35,8 | 18,7 | 15,8 | 4,4 | 8,0 | 9,1 | 80,2 |

3. Jamaican bauxite

| Chemical composition: | | | Mineralogical composition: | | | |
|---|---|---|---|---|---|---|
| $Al_2O_3$ | % | 48,2 | $Al_2O_3$ | % | in gibbsite | 42,2 |
| $Fe_2O_3$ | % | 19,7 | | | in goethite | 0,5 |
| $SiO_2$ | % | 2,1 | | | in hematite | 0,6 |
| $TiO_2$ | % | 2,7 | | | in crandallite | 0,1 |
| FeO | % | 0,3 | | | in lithioforite | 0,2 |
| $Mn_3O_4$ | % | 0,4 | | | in bohmite | 3,1 |
| Ignition | | | | | in diaspore | 0,2 |
| losses | % | 26,1 | | | in kaolinite | 1,3 |
| | | | $Fe_2O_3$ | % | in siderite | 0,4 |
| | | | | | in goethite | 4,2 |
| | | | | | in hematite | 15,1 |
| | | | $SiO_2$ | % | in quartz | 0,5 |
| | | | | | in kaolinite | 1,5 |
| | | | $TiO_2$ | % | in anatase | 2,2 |
| | | | | | in rutile | 0,5 |

Composition and yield of red mud:

| Additive | $Fe_2O_3$ % | $Al_2O_3$ % | $SiO_2$ % | $TiO_2$ % | CaO % | Ignition losses % | $Al_2O_3$ yield % |
|---|---|---|---|---|---|---|---|
| Hydrogarnet | 59,5 | 7,7 | 6,0 | 8,1 | 5,8 | 4,3 | 94,8 |
| CaO | 58,4 | 8,6 | 5,8 | 7,9 | 5,9 | 5,3 | 94,0 |

4. Bauxite of diasporic type

| Chemical composition: | | | Mineralogical composition: | | | |
|---|---|---|---|---|---|---|
| $Fe_2O_3$ | % | 30,50 | $Al_2O_3$ | % | in diaspore | 50,0 |
| $Al_2O_3$ | % | 53,0 | | | in chamosite | 1,2 |
| $SiO_2$ | % | 2,0 | | | in bohmite | 0,5 |
| $TiO_2$ | % | 4,2 | | | in kaolinite | 0,2 |
| CaO | % | 0,13 | | | in corundum | 1,1 |
| | | | $SiO_2$ | % | in kaolinite | 0,3 |
| | | | | | in chamosite | 1,7 |
| | | | $TiO_2$ | % | in anatase | 0,2 |
| | | | | | in ilmenite | 5,7 |
| | | | | | in rutile | 0,3 |
| | | | $Fe_2O_3$ | % | in chamosite | 2,3 |
| | | | | | in goethite | 1,0 |
| | | | | | in hematite | 6,4 |
| | | | | | in maghemite | 17,1 |
| | | | | | in ilmenite | 5,7 |

Composition and yield of red mud:

| Additive | $Fe_2O_3$ % | $SiO_2$ % | $Al_2O_3$ % | CaO % | $TiO_2$ % | Ignition losses % | $Al_2O_3$ yield % |
|---|---|---|---|---|---|---|---|
| Hydrogarnet | 61,4 | 4,8 | 7,7 | 11,7 | 9,2 | 2,6 | 92,8 |
| CaO | 56,7 | 3,4 | 11,9 | 12,1 | 8,6 | 4,5 | 87,9 |

We claim:

1. An improved process for accelerating the digestion procedure of bauxite containing diaspore or goethite processed according to the Bayer technology at a temperature of from 180°–300° C. with the aid of an aluminate liquor having a sodium oxide concentration of from 80–300 g/liter for increasing the alumina yield, for converting goethite into hematite and for recrystallizing the resulting finely dispersed hematite wherein the improvement comprises carrying out the digestion with the addition of a hydrogarnet catalyst having a composition of $$A_3B_2/SiO_4/_{3-x}/(OH)_4/_x$$

in an amount corresponding to 5–20% by weight calculated on the dried weight of the bauxite where A is $Ca^{2+}$, $Mg^{2+}$, $Mn^{2+}$ or $Fe^{2+}$ and B is $Al^{3+}$, $Fe^{3+}$ or $Cr^{3+}$ or $Al^{3+}+yFe^{3+}$, in which y is 0.05 to 0.5, and x is from 0 to 3.

2. A process according to claim 1 wherein A represents $Ca^{2+}$, B represents $Al^{3+}+yFe^{3+}$, in which y is 0.05 to 0.5, and x is 1 to 2.95.

3. A process according to claim 1 wherein the hydrogarnet catalyst is prepared by the reaction of red mud and hydrated lime $Ca(OH)_2$.

4. A process according to claim 1 wherein the hydrogarnet catalyst is prepared by hydrating calcinated lime with aluminate liquor of low alumina content in a way that simultaneously 20–100% red mud is added calculated on the weight of CaO.

5. A process according to claim 1 wherein the hydrogarnet catalyst is prepared in the course of the silica removal prior to digestion in a branch of the cycle with the addition of $Ca(OH)_2$ containing slurry at the time when the dissolved silica content of the solution is the highest.

6. A process according to claim 1 wherein the hydrogarnet catalyst is prepared on hydrating calcinated lime with aluminate liquor and adding simultaneously 20–200% by weight milled bauxite calculated on the weight of the CaO.

7. A process according to claim 6 wherein the hydration of calcinated lime is carried out by such a quantity of a slurry free of silica that the solid content of the slurry free of silica should amount to 20–200% calculated on the weight of CaO.

UNITED STATES PATENT AND TRADEMARK OFFICE
CERTIFICATE OF CORRECTION

PATENT NO. : 4,226,838

DATED : October 7, 1980

INVENTOR(S) : Jozsef Boros et al.

It is certified that error appears in the above-identified patent and that said Letters Patent are hereby corrected as shown below:

On the title page

Add the following additional assignee's name to the heading of the patent;

-- Aluminiumipari Tervező és Kutató Intézet of Budapest, Hungary. --

Signed and Sealed this

Third Day of August 1982

[SEAL]

*Attest:*

*Attesting Officer*

GERALD J. MOSSINGHOFF

*Commissioner of Patents and Trademarks*